Jan. 13, 1959
H. A. EDMONDS ET AL
2,868,349
PALLET CONVEYING APPARATUS
Filed June 19, 1957
3 Sheets—Sheet 1
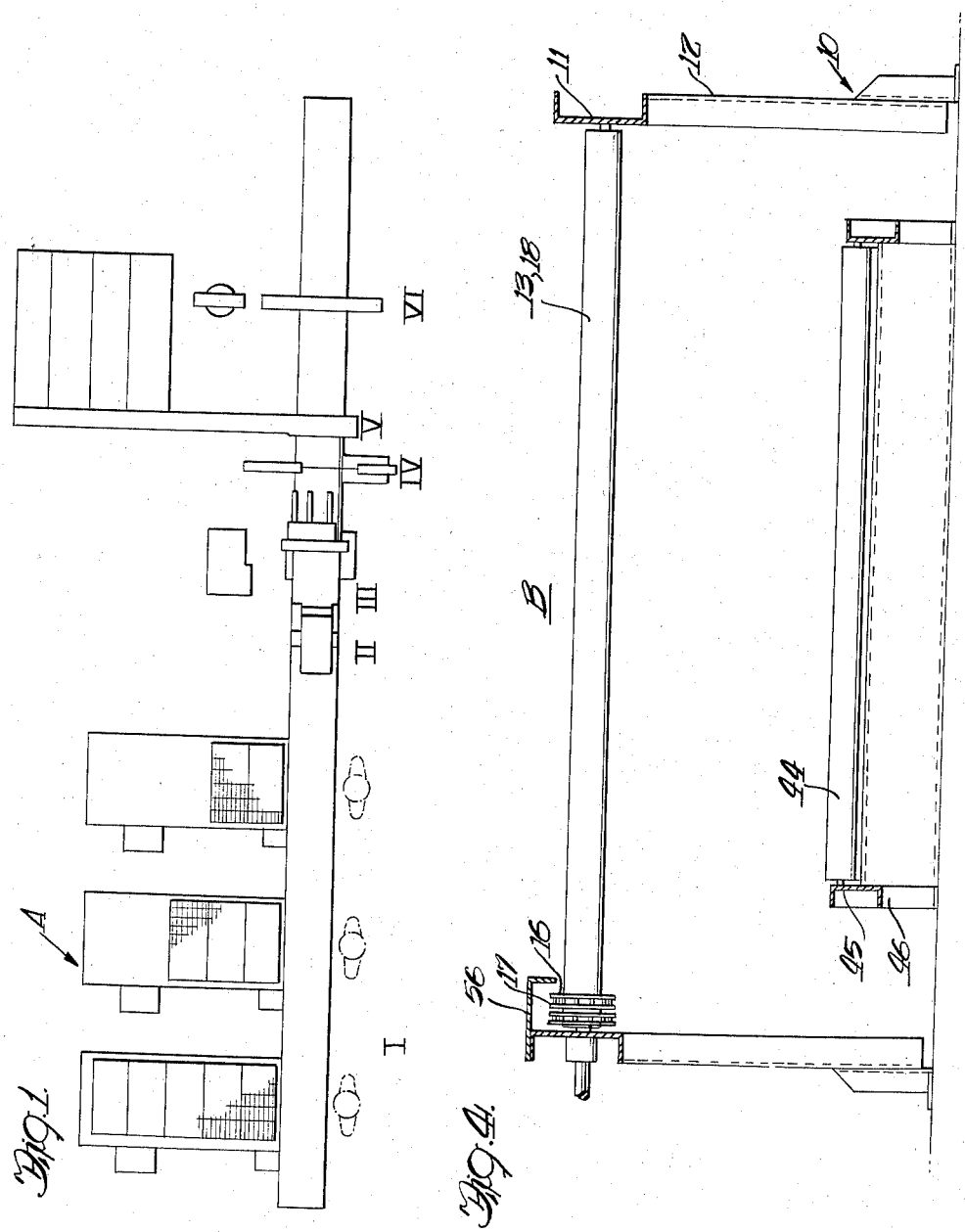
Inventors
Harvey A. Edmonds
William S. Gilbert
Delbert H. Shefte
Attorney Jan. 13, 1959
H. A. EDMONDS ET AL
2,868,349
PALLET CONVEYING APPARATUS
Filed June 19, 1957
3 Sheets-Sheet 2
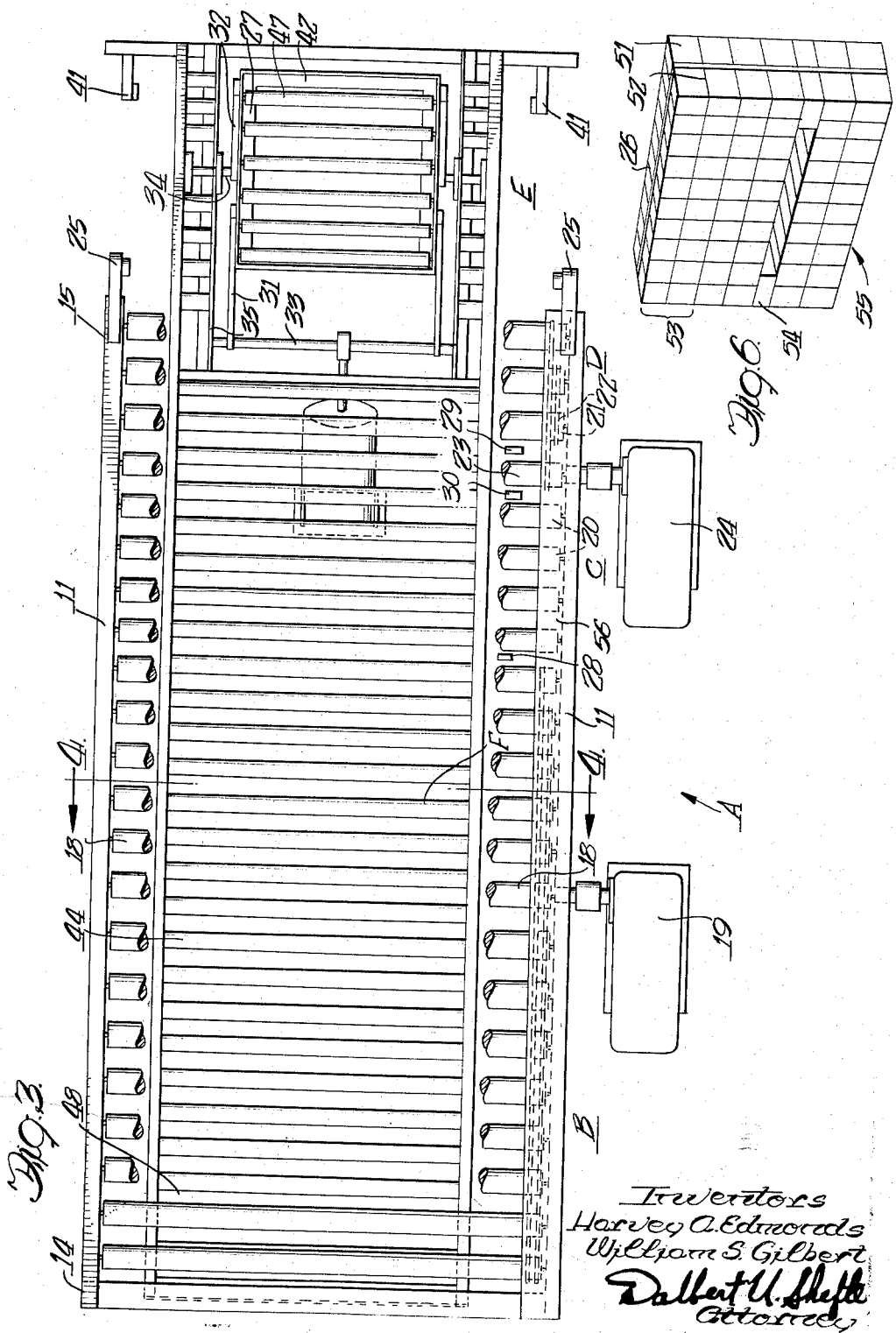

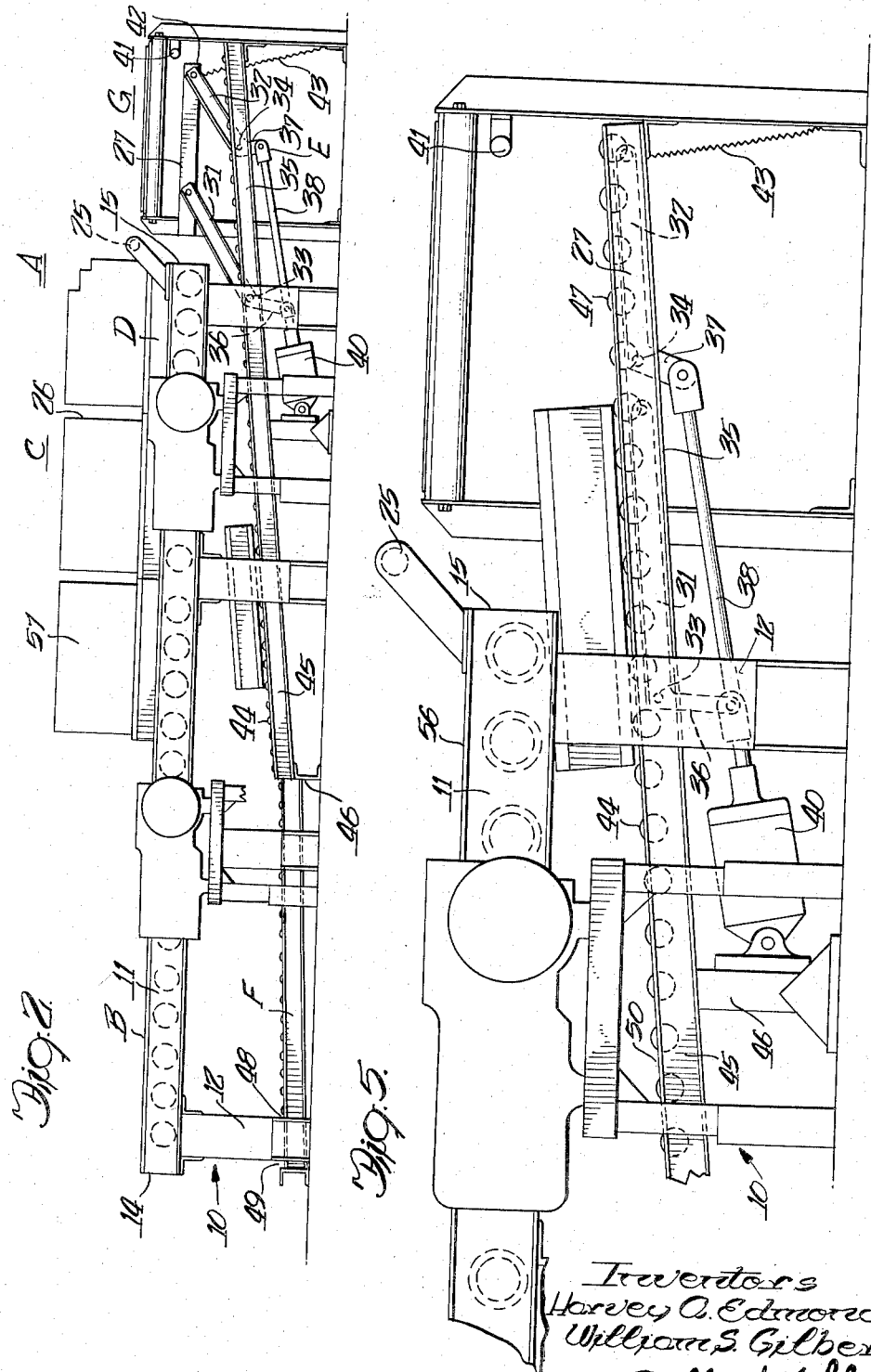

United States Patent Office 2,868,349
Patented Jan. 13, 1959

2,868,349

PALLET CONVEYING APPARATUS

Harvey A. Edmonds, Chicago, and William S. Gilbert, Lincolnwood, Ill., assignors to Structural Clay Products Research Foundation Application June 19, 1957, Serial No. 667,071

10 Claims. (Cl. 198—21)

This invention relates to a pallet conveying apparatus, and more particularly to a pallet conveying apparatus for progressing loaded pallets to an unloading station and discharging unloaded pallets from the unloading station.

In the modern age of automation, one of the difficult problems encountered in constructing multi-operation machines is maintaining a continuous flow of objects to work stations, and this is especially difficult when the work station is a transfer station where objects are to be transferred from one conveyor system to another. Such is the case where pallets loaded with a multitude of objects are advanced by one conveyor system to an unloading station for transfer of the objects from the first conveyor system to a second conveyor system. The particular problems involved are evident when it is realized that each pallet must remain at the unloading station long enough to complete unloading and yet a continuous flow of pallets must be maintained to insure a continuous flow of objects on the second conveyor system. Further, there must be an apparatus for removing the unloaded pallets without obstructing the operation of either of the conveyor systems.

In the manufacture of clay products such as bricks, there has been a recent trend toward packaging of a multitude of bricks to facilitate handling of the bricks at the manufacturing plant, in transportation and storage and at the work site. One type of brick package has been developed by the Structural Clay Products Research Foundation and is shown in Fig. 6 of the drawings to consist of 62 bricks, arranged with openings for insertion of prongs of a lift truck or other vehicle for moving the package. This brick package is disclosed and claimed in U. S. Patent No. 2,778,491, issued January 22, 1957.

To accumulate single bricks and package them in the form described in the preceding paragraph, a method of automation has been devised, which is carried out by a device such as illustrated in Fig. 1, where individual bricks are transferred from a pallet conveying apparatus A onto a conveyor system I which feeds rows of bricks 51 through a paper feed mechanism II and a foldover station III which combines to accumulate a double tier of bricks with a sheet of paper 52 therebetween. The conveyor system then feeds the bricks through a strapper IV which binds the two tiers into a preliminary package 53. These packages are accumulated at V and spacer bricks 54 are inserted to form the final package 55 which is fed through the second strapper VI and removed for transportation or storage.

The present invention is directed to the apparatus for supplying brick to the packaging line where it is often desirable to mix different colored bricks so that the brick delivered to the job site will contain any desired combination. For this purpose a plurality of apparatii are utilized, each apparatus supplying a different colored or textured brick. Each pallet normally is loaded with two stacks of brick, each stack having six courses of thirty brick per course or a total of 360 brick per pallet.

It is the general object of the present invention to provide a new and improved pallet conveying apparatus.

Another object of the invention is to provide a new and improved pallet conveying apparatus for progressing loaded pallets to an unloading station and discharging unloaded pallets from the unloading station.

A further object of the present invention is to provide a pallet conveying apparatus, as described, having a pallet lowering mechanism for receiving unloaded pallets and lowering the pallets to a pallet discharging means.

Still another object of the present invention is to provide a new and improved pallet conveying apparatus wherein a pallet lowering mechanism has a pallet receiving platform which is lowered from a horizontal receiving position to an inclined discharging position.

A still further object of the present invention is to provide a new and improved pallet conveying apparatus wherein an advancing conveyor section advances loaded pallets to a feeding conveyor section which feeds pallets through an unloading station to a pallet lowering mechanism which lowers the pallets for discharge on a discharging conveyor section.

Another object of the present invention is to provide a pallet conveying apparatus of the type described in the preceding paragraph having controls for operating the advancing conveyor section to prevent pallets thereon from forcing pallets on the feeding conveyor section through the unloading station before they are completely unloaded.

Yet a further object of the present invention is to provide a new and improved pallet conveying apparatus as described above, having controls for operating the feeding conveyor section so that as objects are removed from the loaded pallets, the feeding conveyor section will feed the pallets so that the other objects will be fed into the unloading station.

Still another object of the present invention is to provide a new and improved pallet conveying apparatus of the type described above, having controls for lowering the pallet lowering mechanism upon receipt of a pallet thereon.

A still further object of the present invention is to provide a new and improved pallet conveying apparatus of the type described above, having a safety control positioned in the discharge conveyor section so that, when unloaded pallets back up on the discharge conveyor section, the feeding conveyor section will be stopped.

Yet another object of the present invention is to provide a new and improved pallet conveying apparatus of the type described above wherein the discharge conveyor section extends from the pallet lowering mechanism underneath the advancing and feeding conveyor sections.

Yet a further object of the present invention is to provide a new and improved pallet conveying apparatus as described above, wherein the discharge conveyor section is declined rearwardly and is provided with freely rotatable rollers to facilitate movement of pallets thereon.

Other and further objects and advantages of the present invention will be apparent from the following description and drawings in which:

Fig. 1 is a diagrammatic view of an overall brick packaging line;

Fig. 2 is a side elevational view, partially in section, of a pallet conveying apparatus illustrating one embodiment of the present invention;

Fig. 3 is a top plan view, partially in section, of the device of Fig. 1;

Fig. 4 is a vertical sectional view taken along line 4—4 of Fig. 3;

Fig. 5 is an enlarged view of a portion of Fig. 2 showing the pallet lowering mechanism in the lowered position; and Fig. 6 is a perspective view of brick packaged by the structure of Fig. 1.

While this device is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, and in particular Fig. 2, one embodiment of the present invention is shown as a pallet conveying apparatus generally indicated as A and broadly consisting of a pallet advancing conveyor section B, a dead section C, a pallet feeding conveyor section D, a pallet lowering mechanism E, and a pallet discharging conveyor section F.

The advancing section B, dead section C, and feeding section D form a continuous conveyor so that, when loaded pallets 57 are placed on the advancing conveyor section by a truck or any other similar means, they are advanced to the dead section C and then to the feeding section D, where they are intermittently fed toward the continuous conveyor G. The movement of the feeding section is so controlled that as objects adjacent the continuous conveyor G are transferred from the feeding section, the section will feed the pallets 57 to advance the subsequent objects to a position adjacent the continuous conveyor for efficient transfer to the conveyor. The unloaded pallets are fed onto the pallet lowering mechanism E which drops the pallets down onto the pallet discharge section F for discharge of the pallets to a place where they can be removed from the apparatus.

Describing the apparatus in more detail, it will be noted that a framework 10 supports the advancing conveyor section B, dead section C and feeding section D. The framework 10 consists of parallel horizontal plates 11, supported on legs 12, and between which a multitude of rollers 13 are rotatably secured. These rollers are continuous from the rear 14 of the pallet advancing section B through the dead section C and to the front 15 of the pallet feeding section D. The rollers 13 in the pallet advancing conveyor section B are interlinked by a system of sprockets 16 on each roller and a plurality of chains 17, each chain encircling the sprockets on the adjacent rollers. One of the rollers is a drive roller 18 connected to a drive motor 19 that operates the rollers so as to advance pallets through the section.

The dead section C consists simply of plurality of freely rotatable rollers 20, which support pallets advanced thereon by the advancing section B and is of a length less than the length of a pallet so that as a pallet is advanced thereon from the advancing section, it will overlap the pallet feeding section D and will be advanced thereby.

The pallet feeding conveyor section D consists of rollers interconnected by a system of sprockets 21 and chains 22, as illustrated in Fig. 3, similar to the sprocket and chain system of the advancing section B. Similarly, a drive roller 23 is connected to a drive motor 24 which operates the rollers of the section to feed pallets therethrough. To prevent the pallets from contacting the sprockets and chains, an inverted U-shaped channel 56 extends the length of the framework 10 over the sprockets and chains thereby protecting both the pallets and sprocket system.

As the pallets are intermittently fed through the feeding conveyor section D, the objects thereon are unloaded onto the belt G. Controls, such as photoelectric cells 25 are located adjacent the belt G and in line with objects on the pallets such as bricks 26, so that when the beam of the photoelectric cells is broken, the drive motor 24 for the feeding section D will be stopped. Thus, until an object in the beam of the photoelectric cells is unloaded, the pallets will not advance, and, when the objects in the beam are unloaded, the motor will advance the pallet until the next object interrupts the beam. In this way loaded pallets are intermittently fed through the unloading station adjacent the belt and unloaded pallets are fed onto the platform 27 of the pallet lowering mechanism.

To prevent subsequent loaded pallets from forcing the pallets being unloaded into the belt G, a combination of three pallet engaging contacts are positioned in the dead section C and in the feeding section D. The first contact 28 is in the dead section, the second contact 29 is in the feeding section and is spaced from the first contact 28, a distance greater than a single pallet's length. The third contact 30 is intermediate the first and second contacts and spaced from both a distance less than a pallet's length. These contacts are connected in parallel to the power source for the drive motor 19 of the advancing section B so that, when any one of the contacts is not engaging a pallet, the motor will operate the advancing section. However, when all three contacts are engaged by pallets, the power input to the drive motor will be cut off and thus the advancing section will be stopped. As the first and second contacts are spaced a distance greater than a single pallet's length, it is seen that all three contacts will be engaged only when two pallets are in contact with each other or closely adjacent to each other so that, when a pallet is being unloaded, a subsequent pallet will be advanced onto the dead section until it engages the first contact and will remain there until the pallet being unloaded passes beyond the third contact, at which time pallets will be advanced by the advancing section, and the pallet directly behind the pallet being unloaded will advance onto the feeding section D directly behind the pallet being unloaded. Therefore, a continuous flow of loaded pallets to the unloading station is insured.

The pallet lowering mechanism E consists of a horizontal platform 27 for supporting unloaded pallets as they are fed off the feeding section D. The platform is held in the pallet receiving position, as shown in Fig. 2, by two pairs of supporting arms 31 and 32, pivotally secured to the platform 27 and to rods 33 and 34, that are pivotally secured in a framework 35 and have bellcrank arms 36 and 37 extending therefrom. The bellcrank arms 36 and 37 are interconnected by a link 38, which is attached to the piston extending from a pneumatic cylinder 40. This cylinder 40 is actuated by an air pressure source (not shown) for raising and lowering the platform 27. Introduction and release of air pressure to the cylinder is controlled by photo-electric cells 41, positioned adjacent the forward end 42 of the platform, and create a beam which is interrupted by a pallet only when the pallet is wholly on the platform. When the beam is interrupted, the air pressure in the cylinder is released, thereby permitting the weight of the pallet to lower the platform. After a time delay, provided by a timing device (not illustrated), air pressure is once again introduced to the cylinder to raise the platform to the pallet receiving position. A spring 43 is provided to urge the pallet upwardly into the pallet-receiving position, and is of a strength sufficient to hold the platform in the pallet receiving position when no pallet is supported thereby, but is not sufficient to overcome the weight of a pallet so that an empty platform will remain raised when the air pressure to the cylinder is cut off.

The length of the supporting arms 31 and 32 and the length of the bellcrank arms 36 and 37 are such that, when the platform is lowered from the horizontal receiving position to a discharge position, the platform will be declined rearwardly and will nest with the discharge conveyor section F, which consists of freely rotatable rollers 44 mounted across parallel rearwardly declining bars 45, supported on legs 46.

To facilitate the discharge of pallets from the platform, the platform is provided with freely rotatable rollers 47 so that the pallets will be fed by gravity from the platform to the discharge conveyor section F which extends decliningly rearwardly beneath the feeding conveyor section D and the advancing conveyor section B for gravity discharge of the unloaded pallets to a removal station 48 directly below the rear 14 of the advancing conveyor section, from which a truck or other device can be used to remove the unloaded pallets.

To facilitate the removal of pallets and prevent their backing up when prongs of a lift truck or the like are inserted therein, the removal station 48 is dropped a short distance below the preceding rollers of the discharging section F. The distance from the discharging section F to the rear end 49 of the removal station 48 is a distance slightly greater than two pallet lengths so that when the prongs are inserted into two pallets simultaneously, the pallets will back up against the discharging section F to permit full insertion of the prongs of the fork lift truck into the pallets.

To prevent jamming of the apparatus caused by backing up of unloaded pallets on to the discharge section F and onto obstruction with the lowering mechanism E, a safety switch 50 is positioned in the discharge section F and is spaced from the lowered position of the platform a distance greater than the length of a pallet. This safety switch is interconnected with the source of power of the drive motor 24 of the feeding section D, so that when a pallet passes over the safety switch 50, the drive motor 24 will be stopped, thus preventing the feeding of pallets onto the lowering platform. Because of the time necessary to unload the first line of objects, especially when the pallets are loaded with brick, the ordinary sequence of operation will permit an unloaded pallet to be discharged from the platform 27 down the discharge section F and past the safety switch 50 before the first line of objects is removed so that the beam of the photoelectric cells 25 would not be unbroken and the drive motor 24 would not be ordinarilly activated regardless of the tripping of the safety switch 50. Thus the safety switch 50 will only affect the operation of the apparatus when unloaded pallets have backed to a point where a pallet is stopped in engagement with the safety switch 50. At this point, it would be possible for only one more pallet to be discharged from the platform, and since the switch 50 is spaced a distance greater than one pallet's length from the lowered platform 27, this will prevent jamming.

From the above, it is apparent that the pallet conveying apparatus of this invention provides an automatic means for progressing loaded pallets to an unloading station and discharging unloaded pallets therefrom. The apparatus operates automatically and is so controlled that a continuous supply of pallets is fed to the loading station and the discharging of pallets does not hold back the feeding of pallets into the loading station. As the pallets are discharged beneath the advancing and feeding sections, space is conserved, and more importantly, unloaded pallets are located just below the place where loaded pallets are put on the apparatus so that a lift truck bringing loaded pallets to the apparatus can remove unloaded pallets at the same place. Further, the arrangement of the lowering mechanism underneath the continuously moving belt and the discharge section returning below the other structure, provides a convenient and compact apparatus and permits an operator to position himself on the other side of the moving belt adjacent the loaded pallets for convenient manual unloading of the pallets.

We claim as our invention:

1. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; a dead section intermediate said advancing conveyor section and said continuously moving conveyor and adjacent the advancing conveyor section from which loaded pallets are received, said dead section being of a length less than the length of a pallet and upon which pallets are freely movable; an intermittent pallet feeding conveyor section adjacent and intermediate the dead section and the continuously moving conveyor; a second drive means for intermittently operating said feeding conveyor section to intermittently feed loaded pallets from the dead section through the unloading station which is directly above said feeding conveyor section; a pallet lowering mechanism below the continuously moving conveyor having a support, a pallet receiving platform, platform supporting arms pivotally secured to and extending between both said support and platform, connecting linkage interconnecting said arms, and means for moving said connecting linkage thereby pivoting the arms to move the platform from a position adjacent said feeding conveyor section which feeds unloaded pallets onto the platform to a lowered discharge position; a pallet discharging conveyor extending from said lowered platform underneath the feeding conveyor section and the advancing conveyor section; and means for discharging pallets from the lowered platform and moving said pallets on the discharge conveyor away from said platform.

2. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; a dead section intermediate said advancing conveyor section and said continuously moving conveyor and adjacent the advancing conveyor section from which loaded pallets are received, said dead section being of a length less than the length of a pallet and upon which pallets are freely movable; an intermittent pallet feeding conveyor section adjacent and intermediate the dead section and the continuously moving conveyor; a second drive means for intermittently operating said feeding conveyor section to intermittently feed loaded pallets from the dead section through the unloading station which is directly above said feeding conveyor section; a pallet lowering mechanism below the continuously moving conveyor having a support, a pallet receiving platform, platform supporting arms pivotally secured to and extending between both said support and platform, connecting linkage interconnecting said arms, and means for moving said connecting linkage thereby pivoting the arms to move the platform from a position adjacent said feeding conveyor section which feeds unloaded pallets onto the platform to a lowered discharge position, said connecting linkage inter-connecting said arms so that the platform is pivoted from a horizontal position adjacent the feeding conveyor section to a rearwardly declining lowered position from which pallets will gravitate; and a pallet discharging conveyor section having freely rotable rollers thereon and declining rearwardly from said lowered platform below the feeding conveyor section and the advancing conveyor section, the pallets moving on the rollers down the declining discharge conveyor away from the lowered conveyor section.

3. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; a dead section intermediate said advancing conveyor section and said continuously moving conveyor and adjacent the advancing conveyor section from which loaded pallets are received, said dead section being of a length less than the length of a pallet and upon which pallets are freely movable; an intermittent pallet feeding conveyor section adjacent and intermediate the dead section and the continuously moving conveyor; a second drive means for intermittently operating said feeding conveyor section to intermittently feed loaded pallets from the dead section through the unloading station which is directly above said feeding conveyor section; a pallet lowering mechanism below the continuously moving conveyor having a support, a pallet receiving platform, platform supporting arms pivotally secured to and extending between both said support and platform, connecting linkage interconnecting said arms, and means for moving said connecting linkage thereby pivoting the arms to move the platform from a position adjacent said feeding conveyor section which feeds unloaded pallets onto the platform to a lowered discharge position, said connecting linkage interconnecting said arms so that the platform is pivoted from a horizontal position adjacent the feeding conveyor section to a rearwardly declining lowered position from which pallets will gravitate; and a pallet discharging conveyor section having freely rotatable rollers thereon and declining rearwardly from said lowered platform below the feeding conveyor section and the advancing conveyor section, the pallets moving on the rollers down the declining discharge conveyor away from the lowered conveyor section; control means for stopping the first drive means thereby stopping movement of the pallet advancing conveyor section, said means being engageable by pallets on said dead section and said feeding conveyor section to prevent pallets on the advancing conveyor section from forcing loaded pallets through the unloading station before being unloaded; control means for stopping the second drive means thereby stopping movement of the feeding-conveyor section, said control means being sensitive to the load on the pallet adjacent the continuously moving conveyor to stop feeding of the pallet when the load adjacent the continuously moving conveyor remains on the pallet; control means sensitive to the position of a pallet on the platform to operate the means for moving the connecting linkage when a pallet is on the platform to lower the platform for discharge of the pallet therefrom; and control means located on said discharge conveyor section and spaced from the lowered platform, a distance greater than a pallet length, said control means stopping the second drive means when engaged by a pallet thereby stopping said feeding conveyor section.

4. The pallet conveying apparatus of claim 3 wherein the control means for stopping the first drive means include a first pallet engaging contact positioned on the dead section, a second pallet engaging contact on the feeding conveyor section and spaced from the first contact a distance greater than a pallet length, and a pallet engaging contact intermediate said first and second contacts and spaced from both a distance less than a pallet length, the contacts controlling the movement of the advancing conveyor section so that when all three contacts are engaged simultaneously by pallets the advancing conveyor will stop and when any one of the contacts is not engaged by a pallet the advancing conveyor section will operate.

5. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; an idler section intermediate said advancing conveyor section and said continuously moving conveyor and adjacent the advancing conveyor section from which loaded pallets are received, said idler section being of a length less than the length of a pallet and upon which pallets are freely movable; an intermittent pallet feeding conveyor section adjacent and intermediate the idler section and the continuously moving conveyor; a second drive means for intermittently operating said feeding conveyor section to intermittently feed loaded pallets from the idler section through the unloading station which is directly above said feeding conveyor section; a pallet lowering mechanism below the continuously moving conveyor having a support and a pallet receiving platform mounted to move from a position adjacent said feeding conveyor section to a lowered discharge position; and a pallet discharging conveyor extending from said lowered platform underneath the feeding conveyor section and the advancing conveyor section.

6. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; an idler section intermediate said advancing conveyor section and said continuously moving conveyor and adjacent the advancing conveyor section from which loaded pallets are received, said idler section being of a length less than the length of a pallet and upon which pallets are freely movable; an intermittent pallet feeding conveyor section adjacent and intermediate the idler section and the continuously moving conveyor; a second drive means for intermittently operating said feeding conveyor section to intermittently feed loaded pallets from the idler section through the unloading station which is directly above said feeding conveyor section; a pallet lowering mechanism below the continuously moving conveyor, said mechanism having a support and a pallet receiving platform mounted on the support to move from a position adjacent said feeding conveyor section to a lowered discharge position; and a pallet discharging conveyor section having freely rotatable rollers thereon and declining rearwardly from said lowered platform below the feeding conveyor section and the advancing conveyor section, the pallets moving on the rollers down the declining discharge conveyor away from the lowered conveyor section.

7. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; an idler section intermediate said advancing conveyor section and said continuously moving conveyor and adjacent the advancing conveyor section from which loaded pallets are received, said idler section being of a length less than the length of a pallet and upon which pallets are freely movable; an intermittent pallet feeding conveyor section adjacent and intermediate the idler section and the continuously moving conveyor; a second drive means for intermittently operating said feeding conveyor section to intermittently feed loaded pallets from the idler section through the unloading station which is directly above said feeding conveyor section; a pallet lowering mechanism having a support and a pallet receiving platform mounted thereon to move from a position adjacent said feeding conveyor section to a lowered discharge position; a pallet discharging conveyor section supported adjacent said platform discharge position to receive pallets from the platform; control means for stopping the first drive means thereby stopping movement of the pallet advancing conveyor section, said means being engageable by pallets on said idler section and said feeding conveyor section to prevent pallets on the advancing conveyor section from forcing loaded pallets through the unloading station before being unloaded; control means for stopping the second drive means thereby stopping movement of the feeding-conveyor section, said control means being sensitive to the load on the pallet adjacent the continuously moving conveyor to stop feeding of the pallet when the load adjacent the continuously moving conveyor remains on the pallet; control means sensitive to the position of a pallet on the platform to operate means to lower the platform for discharge of the pallet therefrom; and control means located on said discharge conveyor section and spaced from the lowered platfrom a distance greater than a pallet length, said control means stopping the second drive means when engaged by a pallet thereby stopping said feeding conveyor section.

8. The pallet conveying apparatus of claim 7 wherein the control means for stopping the first drive means include a first pallet engaging contact positioned on the idler section, a second pallet engaging contact on the feeding conveyor section and spaced from the first contact a distance greater than a pallet length, and a pallet engaging contact intermediate said first and second contacts and spaced from both a distance less than a pallet length, the contacts controlling the movement of the advancing conveyor section so that when all three contacts are engaged simultaneously by pallets the advancing conveyor will stop and when any one of the contacts is not engaged by a pallet the advancing conveyor section will operate.

9. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; an idler section intermediate said advancing conveyor section and said continuously moving conveyor and adjacent the advancing conveyor section from which loaded pallets are received, said idler section being of a length less than the length of a pallet and upon which pallets are freely movable; an intermittent pallet feeding conveyor section adjacent and intermediate the idler section and the continuously moving conveyor; a second drive means for intermittently operating said feeding conveyor section to intermittently feed loaded pallets from the idler section through the unloading station which is directly above said feeding conveyor section; a pallet lowering mechanism having a support and a pallet receiving platform mounted thereon to move from a position adjacent said feeding conveyor section to a lowered discharge position; control means for stopping the first drive means thereby stopping movement of the pallet advancing conveyor section, said means being engageable by pallets on said idler section and said feeding conveyor section to prevent pallets on the advancing conveyor section from forcing loaded pallets through the unloading station before being unloaded; control means for stopping the second drive means thereby stopping movement of the feeding-conveyor section, said control means being sensitive to the load on the pallet adjacent the continuously moving conveyor to stop feeding of the pallet when the load adjacent the continuously moving conveyor remains on the pallet; and control means sensitive to the position of a pallet on the platform to operate means to lower the platform for discharge of the pallet therefrom.

10. A pallet conveying apparatus for progressing pallets loaded with objects to an unloading station adjacent a continuously moving conveyor and discharging unloaded pallets back away from the unloading station, the pallet conveying apparatus comprising: a pallet advancing conveyor section; a first drive means for operating said advancing conveyor to advance pallets toward the continuously moving conveyor; an idler section intermediate said advancing conveyor section and said continuously moving conveyor and adjacent the advancing conveyor section from which loaded pallets are received, said idler section being of a length less than the length of a pallet and upon which pallets are freely movable; an intermittent pallet feeding conveyor section adjacent and intermediate the idler section and the continuously moving conveyor; a second drive means for intermittently operating said feeding conveyor section to intermittently feed loaded pallets from the idler section through the unloading station; control means for stopping the first drive means thereby stopping movement of the pallet advancing conveyor section, said control means comprising a first pallet engaging contact positioned on the idler section, a second pallet engaging contact on the feeding conveyor section and spaced from the first contact a distance greater than a pallet length, and a pallet engaging contact intermediate said first and second contacts and spaced from both a distance less than a pallet length, the contacts controlling the movement of the advancing conveyor section so that when all three contacts are engaged simultaneously by pallets the advancing conveyor will stop and when any one of the contacts is not engaged by a pallet the advancing conveyor section will operate.

References Cited in the file of this patent

UNITED STATES PATENTS

| | | |
|---|---|---|
| 504,394 | Maddock | Sept. 5, 1893 |
| 1,556,438 | Hanson | Oct. 6, 1925 |
| 2,700,449 | Gleason | Jan. 25, 1955 |